United States Patent
Osborne et al.

(10) Patent No.: US 8,344,577 B2
(45) Date of Patent: Jan. 1, 2013

(54) SOLID PHASE WELDING OF ALUMINUM-BASED ROTORS FOR INDUCTION ELECTRIC MOTORS

(75) Inventors: Richard J. Osborne, Shelby Township, MI (US); Yucong Wang, West Bloomfield, MI (US); Qigui Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 12/872,036

(22) Filed: Aug. 31, 2010

(65) Prior Publication Data

US 2012/0049687 A1    Mar. 1, 2012

(51) Int. Cl.
*H02K 17/00*    (2006.01)
(52) U.S. Cl. ........................................................ 310/211
(58) Field of Classification Search .................. 310/211, 310/596; 29/596
See application file for complete search history.

(56) References Cited

U.S. PATENT DOCUMENTS

| | | | | |
|---|---|---|---|---|
| 6,066,904 A * | 5/2000 | Fei et al. | ........................ | 310/168 |
| 6,088,906 A * | 7/2000 | Hsu et al. | ...................... | 310/211 |
| 6,184,606 B1 * | 2/2001 | Pyrhonen | ....................... | 310/182 |
| 6,877,210 B2 * | 4/2005 | Hsu | ................. | 29/598 |

* cited by examiner

*Primary Examiner* — Nguyen N Hanh
(74) *Attorney, Agent, or Firm* — Dinsmore & Shohl LLP

(57) ABSTRACT

Squirrel cage rotors of aluminum end rings solid state welded to aluminum conductor bars for use in electric motors and methods of making them are described. In one embodiment, the method includes: providing a laminated steel stack having a plurality of longitudinal slots; placing a plurality of aluminum conductor bars in the longitudinal slots, the conductor bars having first and second ends extending out of the longitudinal slots; contacting the first and second ends of the conductor bars with a pair of aluminum end rings under pressure; and oscillating the first and second ends of the conductor bars, the end rings, or both to form an oscillation friction weld.

20 Claims, 15 Drawing Sheets

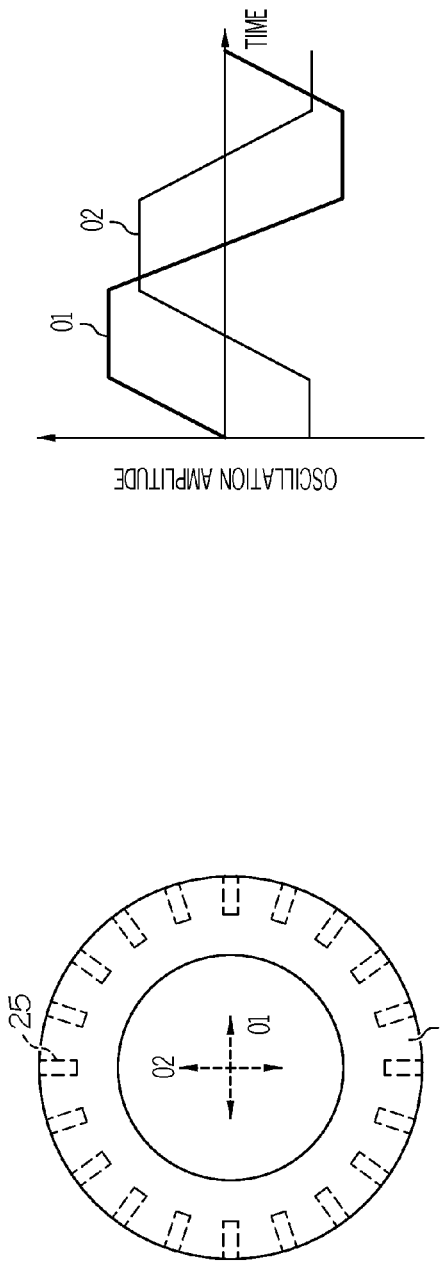

SOLID PHASE WELDING OF ALUMINUM-BASED ROTORS FOR INDUCTION ELECTRIC MOTORS

FIELD OF THE INVENTION

The present invention relates to methods of manufacturing induction rotors for electrical machines and, more particularly, to manufacturing processes for joining conductor bars and end rings, and to rotors having end rings welded to the conductor bars.

BACKGROUND OF THE INVENTION

Increasing demands in fuel efficiency has made hybrid systems more attractive in the automotive industry. In addition to a conventional combustion engine, an electric motor is an important part of the hybrid system. Alternating current (AC) induction motors are commonly used because they offer simple, rugged construction, easy maintenance, and cost-effectiveness. The AC induction motor includes two assemblies: a stator and a rotor. The stator is the outermost component of the motor and is composed of steel laminations shaped to form poles with copper wire coils wound around the poles. The primary windings are connected to a voltage source to produce a rotating magnetic field.

A squirrel cage rotor is a cylinder that is mounted on a shaft rotating in an induction motor. It contains longitudinal conductor bars set into squirrel slots and connected together at both ends by short rings forming a cage-like shape. FIG. 1 shows an illustration of one embodiment of a squirrel cage rotor. The core of the rotor is built with stacks of electrical steel laminations.

The field windings in the stator of an induction motor set up a rotating magnetic field around the rotor. The relative motion between this field and the rotation of the rotor induces electric current in the conductor bars. In turn, these currents lengthwise in the conductors react with the magnetic field of the motor to produce force acting at a tangent to the rotor, resulting in torque to turn the shaft and the rotor. In effect, the rotor is carried around with the magnetic field, but at a slightly slower rate of rotation. The difference in speed is called slip, and it increases with load.

The conductor bars are often skewed slightly along the length of the rotor (i.e., the conductor bars are not perpendicular to the plane of the end ring where the end ring attaches to the conductor bars) to reduce noise and to smooth out torque fluctuations that might result in some speed variations due to interactions with the pole pieces of the stator, as shown in FIG. 1. The number of bars on the squirrel cage determines to what extent the induced currents are fed back to the stator coils and hence the current through them. The constructions that offer the least feedback employ prime numbers of bars.

The iron core (laminate steel stack) serves to carry the magnetic field across the motor. The structure and materials for the iron core are specifically designed to minimize magnetic losses. The thin laminations (steel sheets), separated by varnish insulation, reduce stray circulating currents that would result in eddy current loss. The material for the laminations is a low carbon, high silicon steel with several times the electrical resistivity of pure iron, further reducing eddy-current loss. The low carbon content makes it a magnetically soft material with low hysteresis loss.

The same basic design is used for both single-phase and three-phase motors over a wide range of sizes. Rotors for three-phase motors will have variations in the depth and shape of bars to suit the design classification.

A common aluminum rotor construction method is to cast an aluminum alloy into the laminated steel slots and simultaneously cast end rings creating an electrical circuit. Cast aluminum rotors (bars and end rings together) can have low mechanical properties, in particular, the low electric (pure Al: IACS 62%) and thermal conductivity of aluminum alloys, particularly when the cast aluminum conductor bars have casting defects including hot-tear cracks, porosity, and oxide inclusion etc, impose a great challenge for their successful application in electric motors. In addition, the aluminum alloys used to cast rotor squirrel cages are usually high purity aluminum, high purity aluminum casting alloys, or electric grade wrought alloys which are all difficult to cast because of their low fluidity, high shrinkage rate (density change from liquid to solid), high melting temperature, and large freezing range (temperature difference between liquids and solids), etc. These characteristics of the higher purity aluminum alloys increase porosity and the tendency of hot tearing, particularly at the locations where the conductor bars connect to the end rings, which leads to fracture between the conductor bars and the end rings. Furthermore, many cast aluminum squirrel rotor cages are made by high pressure die casting process in order to fill the thin and long bars (squirrel slots) in the laminate steel stack quickly to avoid cold shuts. The entrained air and abundant aluminum oxides produced during the high pressure die casting process, which are due to very high flow velocity (about 60 m/s) in mold filling, can not only decrease rotor quality and durability, but also significantly reduce the thermal and electric conductivity of the rotor, particularly in the conductor bars. In practice, it is often seen that the electric conductivity of the cast aluminum rotor (casting conductor bars and casting end rings) is only about 40 to about 45% IACS. Because of the casting defects present in the cast aluminum conductor bars, the bars may be broken during motor operation. The broken bars will further reduce rotor conductivity and motor performance.

Typically, either pure aluminum (99.7% purity), which has high electrical conductivity but low mechanical properties, or A6101-T61 alloy (0.6% Mg-0.5% Si), which has relatively high conductivity (59%) with improved strength, are used for rotors. The material's composition, electrical conductivity, and static/cyclic fatigue strength are very important to the motor's performance and durability. Therefore, high integrity wrought aluminum conducting bars and end rings are considered as replacements to the cast aluminum rotors.

Another process for making squirrel rotor cages involves inserting aluminum conducting bars through the slots in the lamination stack, rotating (or skewing) the steel lamination stack to produce slot skew (if a skewed rotor design is desired), and joining the aluminum end rings to the aluminum conductor bars by a solid state welding process.

Solid state welding is a group of welding processes which produce interfacial coalescence (joining) at temperatures essentially below the melting point of the base materials being joined, without the addition of filler metal. Pressure may or may not be used depending on the particular process. This group of welding processes includes for example, cold welding, diffusion welding, forge welding, friction welding, hot pressure welding, roll welding, and ultrasonic welding.

With some welding processes, such as friction welding, where one piece is stationary and the other piece is continuously rotating, the amount of friction force and heat generated can cause a large plastic deformation. This can result in a change in the position of the conductor bars during welding, as illustrated in FIG. 2, which is undesirable. The squirrel cage rotor 10 includes a pair of aluminum end rings 15 and the laminate steel stack 20. There are aluminum conductor bars 25 in the slots of the laminate steel stack 20. The dotted lines 30 show the original (and desired) position of the conductor bars. However, the severe plastic deformation in traditional friction welding causes the bar ends to be moved to the final position 35 which is undesired.

Friction welding is a solid state welding process which produces coalescence of materials by the heat obtained from the mechanically induced sliding motion between rubbing surfaces. The work parts are held together under pressure. The process usually involves continuously rotating one part against another to generate frictional heat at the junction as shown in FIG. 3. When a suitable high temperature has been reached, rotational motion ceases, additional pressure is applied, and coalescence occurs.

There are several variations of the friction welding process. In one, one part is held stationary, and the other part is rotated to a constant rotational speed. The two parts are brought into contact under pressure for a specified period of time with a specific pressure. Rotating power is disengaged from the rotating piece, and the pressure is increased. When the rotating piece stops, the weld is complete. Either the end rings or the lamination steel assembly with the conductor bars can be rotated while the other is held stationary. Another type of friction welding is inertia welding. In this process, a flywheel is revolved until a preset speed is reached. It, in turn, rotates one of the pieces to be welded. The motor is then disengaged from the flywheel, and the other part to be welded is brought in contact with the rotating piece under pressure. At a predetermined time, the rotational speed of the part is reduced, the flywheel is brought to an immediate stop, and additional pressure is provided to complete the weld.

Frictional welding has a number of advantages. It allows the production of high quality welds in a short cycle time. No filler metal is required, and flux is not used. The process is capable of welding most common metals, and it can be used to join many combinations of dissimilar metals. It can be used with 6101-T61 alloy components that have been processed with a solution heat treatment and aged to provide optimum strength and conductivity. It also requires minimum heat input which will generate a minimum heat affected zone and have little influence on conductivity and material properties.

However, friction welding requires a relatively expensive apparatus.

Another solid welding process is ultrasonic welding, which produces coalescence by the local application of high-frequency vibratory energy as the work parts are held together under pressure. Welding occurs when the ultrasonic tip (or sonotrode), the energy coupling device, is clamped against the workpiece and is made to oscillate in a plane parallel to the weld interface. The combined clamping pressure and oscillating forces introduce dynamic stresses in the base metal. This produces minute deformations which create a moderate temperature rise in the base metal at the weld interface. This, coupled with the clamping pressure, provides for coalescence across the interface to produce the weld. Ultrasonic energy will aid in cleaning the weld area by breaking up oxide films and causing them to be carried away.

The vibratory energy that produces the minute deformation comes from a transducer which converts high-frequency alternating electrical energy into mechanical energy. The transducer is coupled to the workpiece by various types of tooling, including tips similar to resistance welding tips. The normal weld is a lap joint weld.

The temperature at the weld is not raised to the melting point, and therefore, there is no nugget similar to resistance welding. Weld strength is equal to the strength of the base metal. Most ductile metals can be welded together, and there are many combinations of dissimilar metals that can be welded.

As illustrated in FIGS. 4-5, the work pieces 110, 115 are placed between a fixed machine part, e.g., the anvil 120, and the ultrasonic weld head 105 oscillates horizontally during the welding process at high frequency (usually about 20, about 35, or about 40 Hz). Static pressure is applied normal to the welding interface. The pressure forces are superimposed by the high-frequency oscillating shearing force. As long as the forces in the work pieces are below their elastic limit, the pieces will not deform. The shearing forces at high frequency break down the surface oxide layer, remove it, and produce a bond between the pure metal interfaces. The circular assembled rotor could be rotated (indexed) to weld each bar to the end rings, or it may be possible with a multi-head tool to weld both end rings to the ends of each conducting bar simultaneously.

Another solid state welding process is laser welding, as shown in FIG. 6. Laser welding does not add any filler, and it is a pure fusion weld process. A Nd:YAG (neodymium:yttrium-aluminum garnet) laser is preferred because it is more compatible with aluminum than a $CO_2$ laser. The wavelength of a YAG laser is extremely short (1.064 nm), which readily couples with the highly reflective aluminum surfaces. Typically, two beams would be used in a single laser so that the metal remains molten longer and fills the weld more consistently. Lasers with power ranging from two to eight kW would be beamed through the two lenses. The two beams per laser help to overcome the tendency of aluminum to cool rapidly. The pure aluminum or alloyed conducting bars would be inserted through the laminated stack slots and into slotted end rings. The twin beam YAG laser system would then weld the conducting bar to the end ring from top and side positions. Two lasers could be used, one (A) to weld the top of the conducting bar to the end ring 15, and one (B) to weld the side of the bars to the end ring. Using laser welding, each conductor bar would have to be welded separately, increasing the time required to form the squirrel cage.

In the various welding processes, time, temperature, and pressure, individually or in combination, produce coalescence of the base metal without significant melting of the base metal. Some of the processes offer certain advantages because the base metal does not melt and form a nugget. The metals being joined retain their original properties without the heat-affected zone problems involved when there is base metal melting. In some processes, the time element is extremely short, e.g., in the microsecond range or up to a few seconds.

Therefore, there is a need for an improved rotor for an electric machine, and for methods of making improved rotors.

SUMMARY OF THE INVENTION

The invention relates to methods of manufacturing induction rotors for electric machines. Aluminum conducting bars and end rings are assembled and joined. The rotor cage will have high electrical conductivity and high mechanical properties (e.g., strength and fatigue) for improved machine durability, performance, lower rejection rate and lower manufacturing cost. The invention can be applied to alternative current (AC) induction motors as well as other types of electric machines including, but not limited to, direct current (DC) motors.

One aspect of the invention involves a method of making a rotor. In one embodiment, the method includes: providing a laminated steel stack having a plurality of longitudinal slots;

placing a plurality of aluminum conductor bars in the longitudinal slots, the conductor bars having first and second ends extending out of the longitudinal slots; contacting the first and second ends of the conductor bars with a pair of aluminum end rings under pressure; and oscillating the first and second ends of the conductor bars, the end rings, or both to form an oscillation friction weld.

Another aspect of the invention relates to a rotor. In one embodiment, the rotor includes: a pair of aluminum end rings; a cylindric laminate steel stack positioned between the pair of end rings, the laminate steel stack having a plurality of longitudinal slots therein; a plurality of aluminum conductor bars positioned in the longitudinal slots of the laminate steel stack, the plurality of conductor bars having first and second ends, the first and second ends being oscillation friction welded to the pair of end rings.

BRIEF DESCRIPTION OF THE DRAWINGS

FIGS. 14A-C illustrate how the orbital rectangular motion oscillation is generated between the end rings and the conductor bars by two oscillators with sawtooth waves.

DETAILED DESCRIPTION OF THE INVENTION

Figure 1:
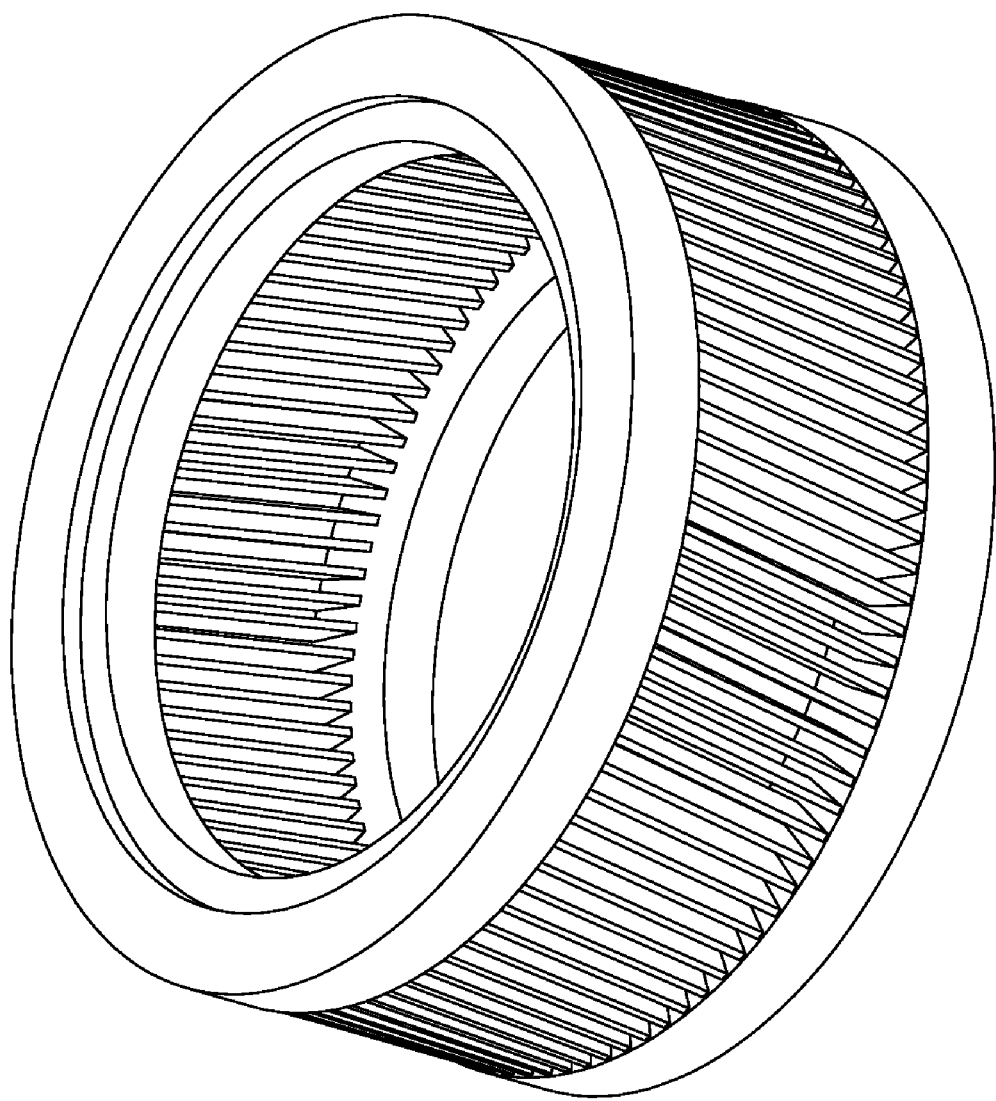
FIG. 1 is an illustration of one embodiment of a squirrel cage rotor.
Figure 2:
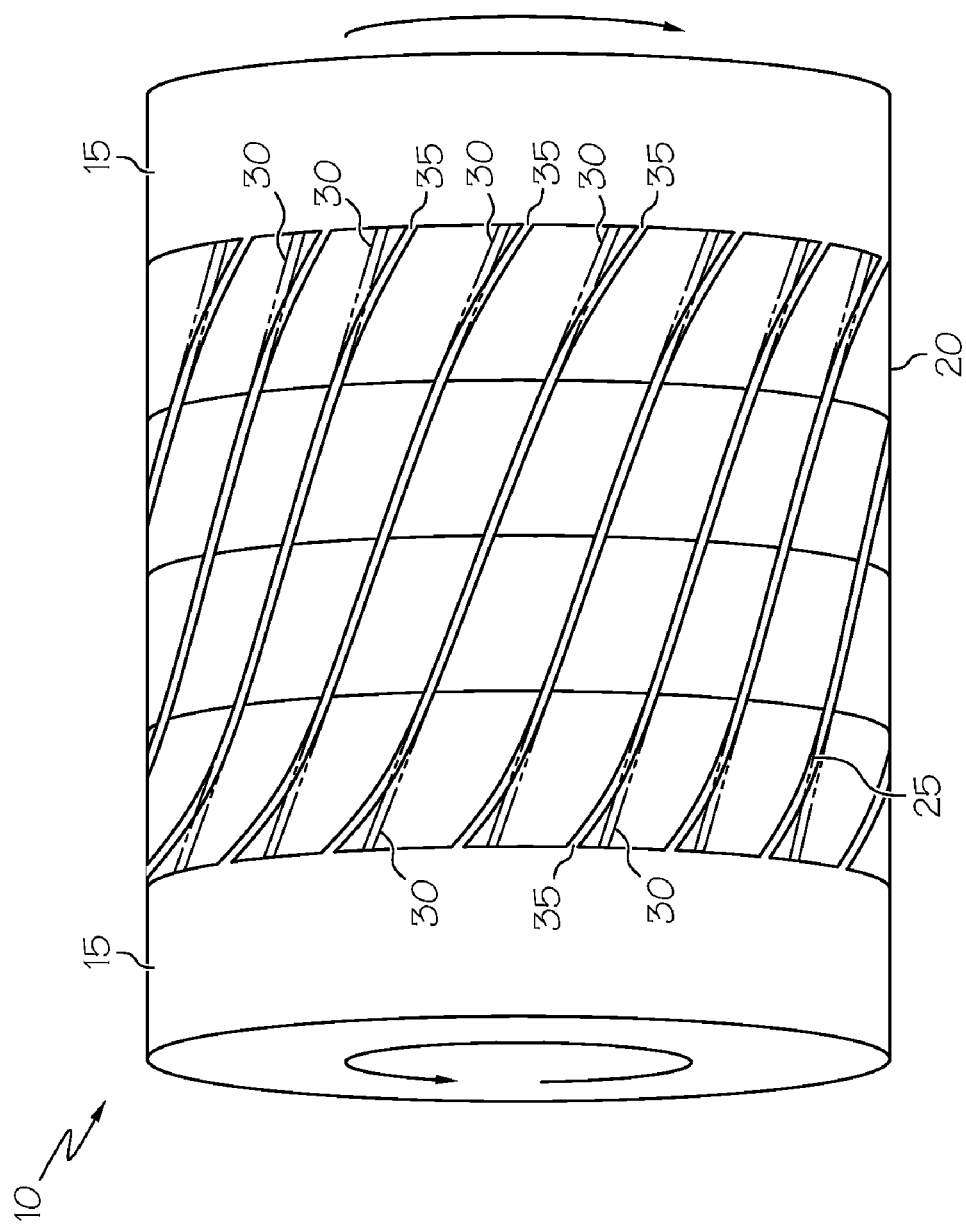
FIG. 2 is an illustration of plastic deformation caused by a conventional friction welding.
Figure 3:
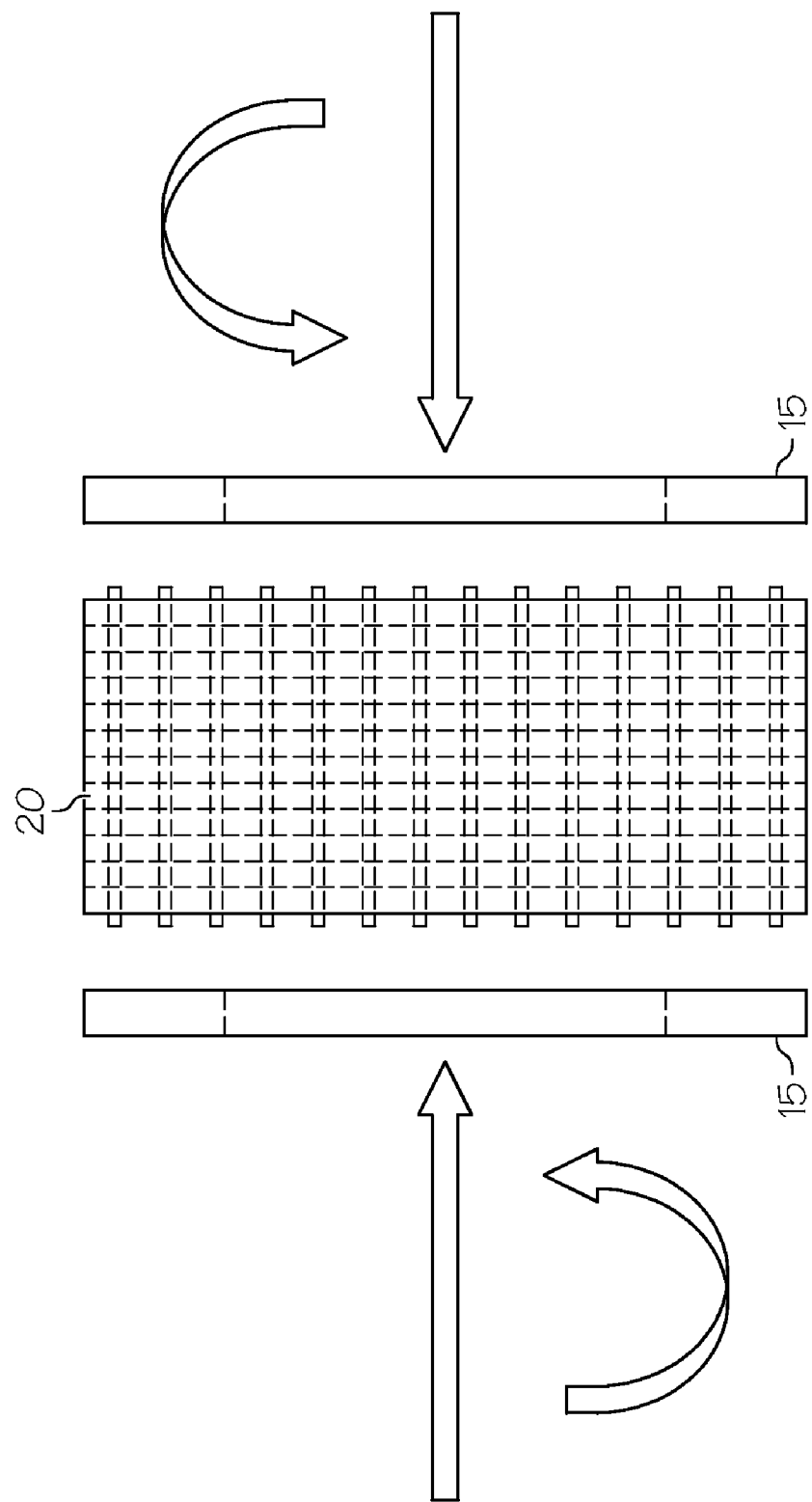
FIG. 3 is an illustration of one embodiment of a friction welding process.
Figure 4:
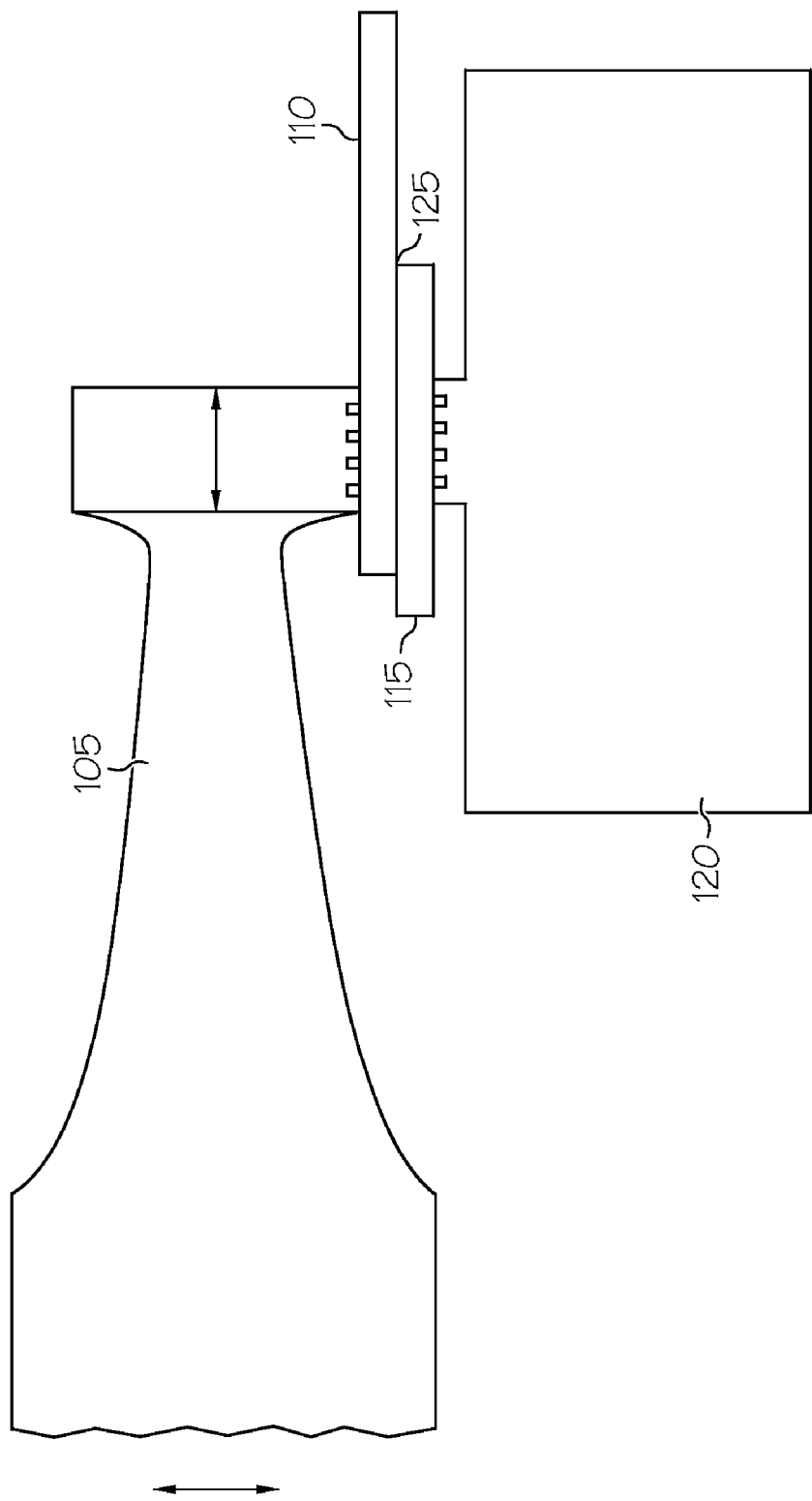
FIG. 4 is an illustration of one embodiment of an ultrasonic welding process.
Figure 5:
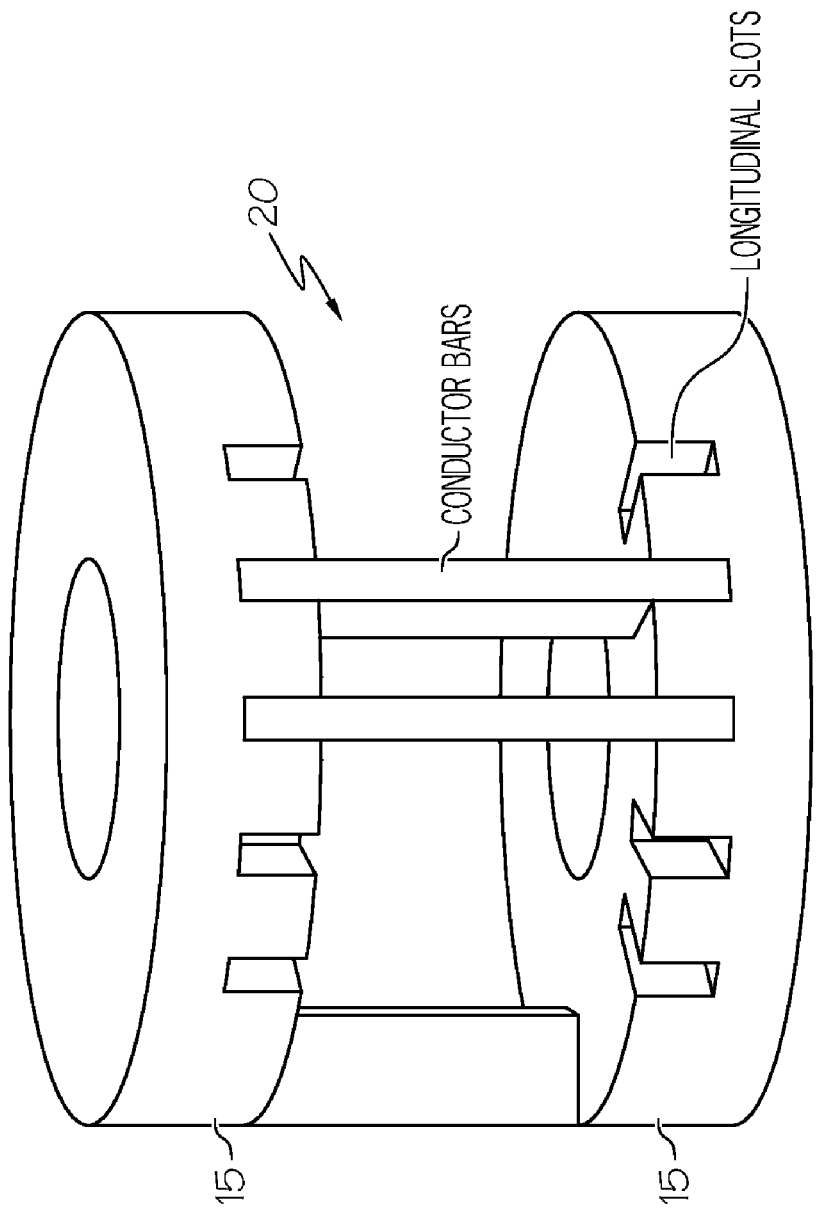
FIG. 5 is an illustration of one embodiment of an ultrasonic welding process.
Figure 6:
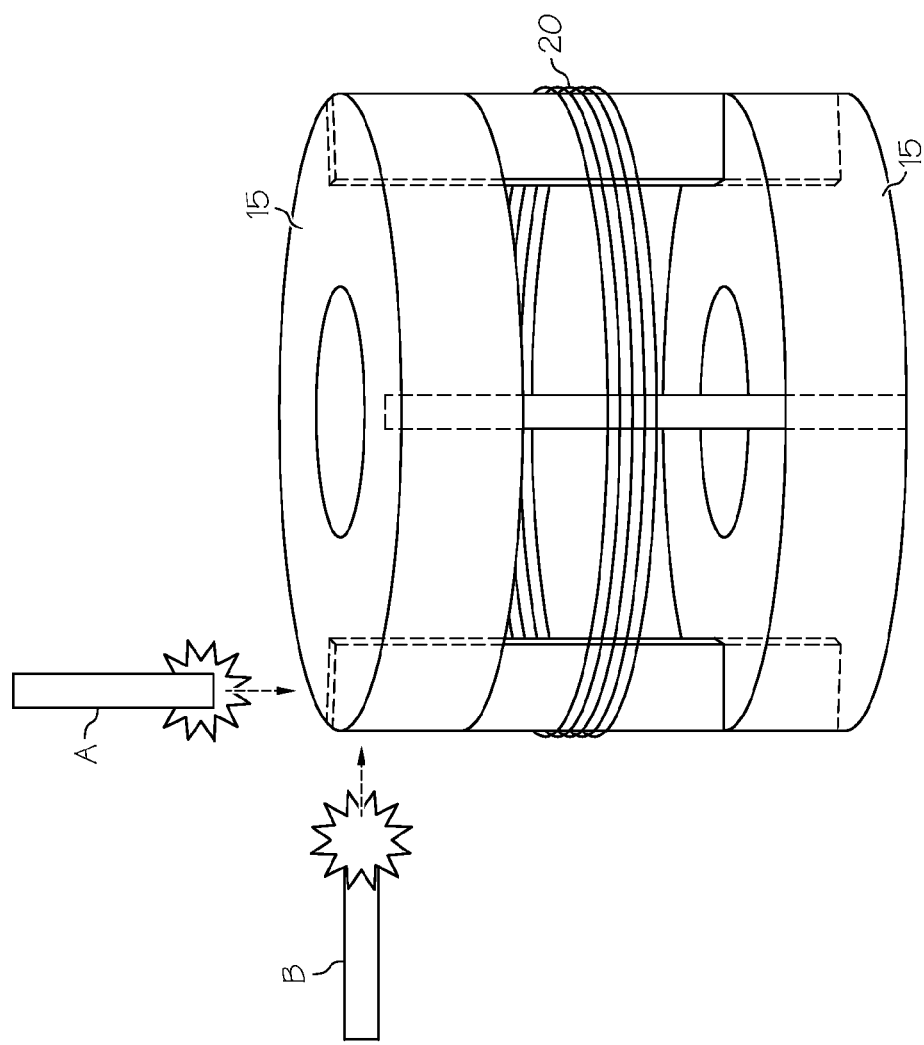
FIG. 6 is an illustration of one embodiment of a laser welding process.

The present invention utilizes a variation of the friction welding process. Instead of complete rotation as in a typical friction welding process, in the oscillation friction welding process, one of the pieces (either the end rings or the lamination steel stack with the conductor bars) to be joined is oscillated back and forth rapidly with very high frequency (about 20 to about 150 Hz) and small amplitude (about 0.05 to about 3 mm) with normal pressure (about 10 to about 300 MPa) (oscillation friction welding) while the other piece is held stationary. Because of the small contact area and small oscillation distance, heat is generated only in the contact area. The high frequency of the oscillation means the heat is not dissipated.

There are several important factors involved in making an oscillation friction weld including, but not limited to, oscillation frequency, oscillation amplitude, oscillation path, applied load, and time. The oscillation frequency is related to the material to be welded. The oscillation amplitude and path is related the area of the weld at the interface. The applied load changes during the weld sequence. Initially, it is very low, but it is increased to create the frictional heat. When the oscillation is stopped and both pieces of materials to be welded are aligned to the right position, the applied load is rapidly increased so that forging takes place immediately. The time depends on the shape, the type of metal, and the surface area. It is normally a matter of a few seconds. The operation of the machine is automatic and controlled by a sequence controller which can be set according to the weld schedule established for the parts to be joined.

The aluminum bars protrude about 0.5 to about 5 mm from the lamination stack, and they are in good contact with the end rings. The maximum protruded length of the aluminum bars prior to oscillation friction welding may be determined by:

$$L_{max} << \frac{A_{ring}}{A_{bar}} L_{tol} \qquad (1)$$

where $A_{ring}$ is the contact area between the end ring and the laminate steel stack; $A_{bar}$ is the area of the bars contacting the end ring; and $L_{tol}$ is the maximum axial tolerance between the end ring and the laminate steel stack.

The oscillation time is in the range of about 0.5 to about 10 min. The pressure applied to both oscillated end rings and conductor bars is controlled below 90% of the yield strength of the softer material between the end rings and the conductor bars.

The total oscillation area in the interface between conductor bars and end rings may be determined by:

$$A = \frac{F}{\sigma(T)} \qquad (2)$$

where A is the total oscillation area, F is the load applied to the oscillation interface, and $\sigma(T)$ is the temperature-dependent compression strength of the material. The temperature produced at the oscillation interface is the function of time (t), applied load (F), oscillation frequency ($\omega$), and oscillation amplitude (x).

$$T = f(t, F, \omega, x) \qquad (3)$$

Figure 7C:
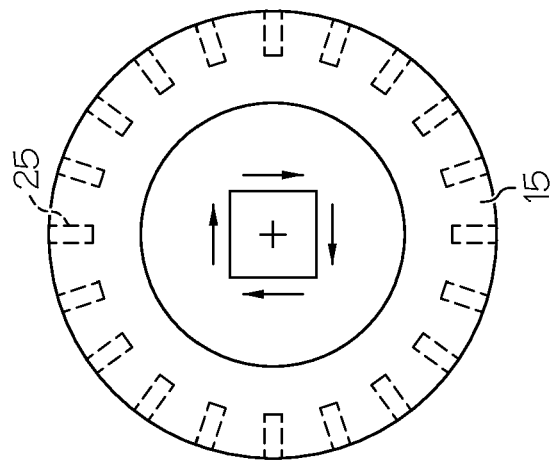
FIGS. 7A-C are illustrations of various types of oscillation which can be used with oscillation friction welding.
Figure 7B:
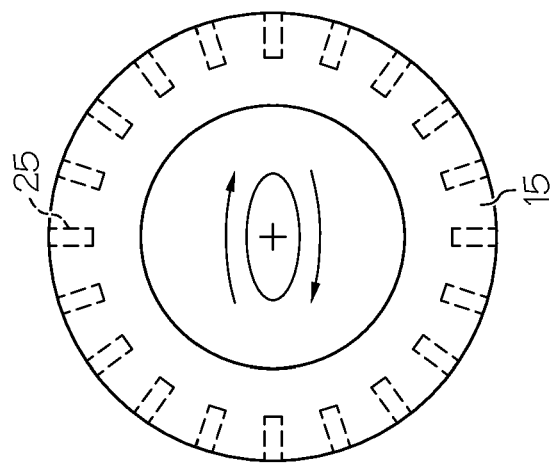
Figure 7A:
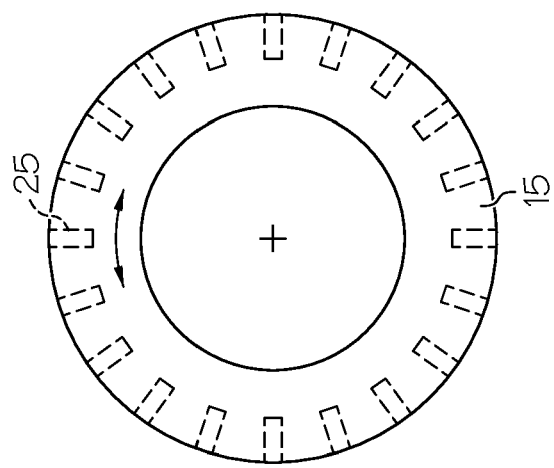
Figure 8B:
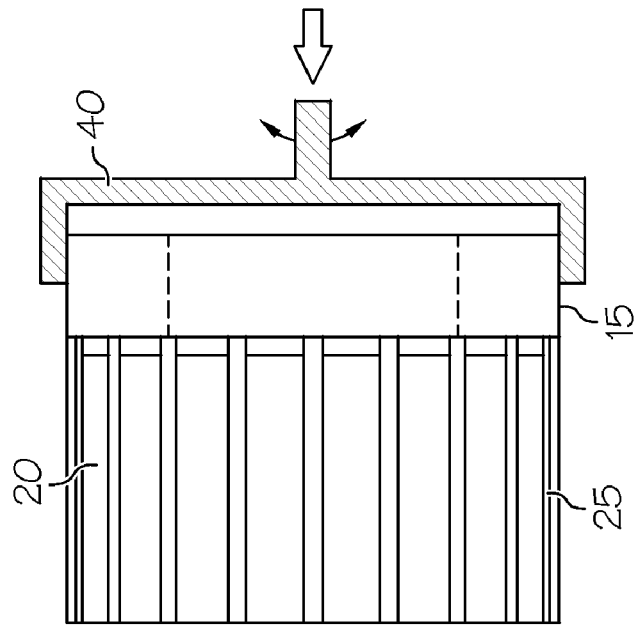
FIGS. 8A-B illustrate how the end ring oscillates against the conductor bars in clockwise/counterclockwise directions by a two-way rotating driver.
Figure 8A:
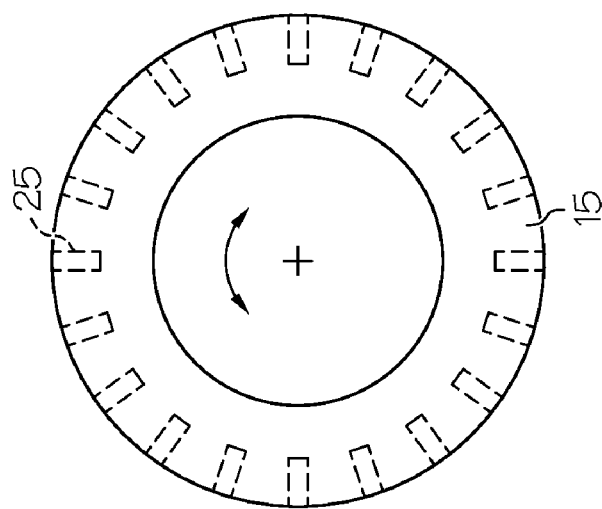

The oscillation can be performed in a variety of ways as illustrated in FIGS. 7A-C. For example, the oscillation can be in a back and forth motion, an orbitally circular or elliptical manner, or in a square or rectangular manner. Other types of oscillation could also be used. In one embodiment, as illustrated in FIGS. 8A-B, the conductor bars and the end rings oscillate in a clockwise/counterclockwise direction produced by a two-way rotating driver. There is an end ring fixture 40 attached to the end ring 15. A force is exerted to push the end ring 15 against the conductor bars 25 during oscillation.

Figure 9B:
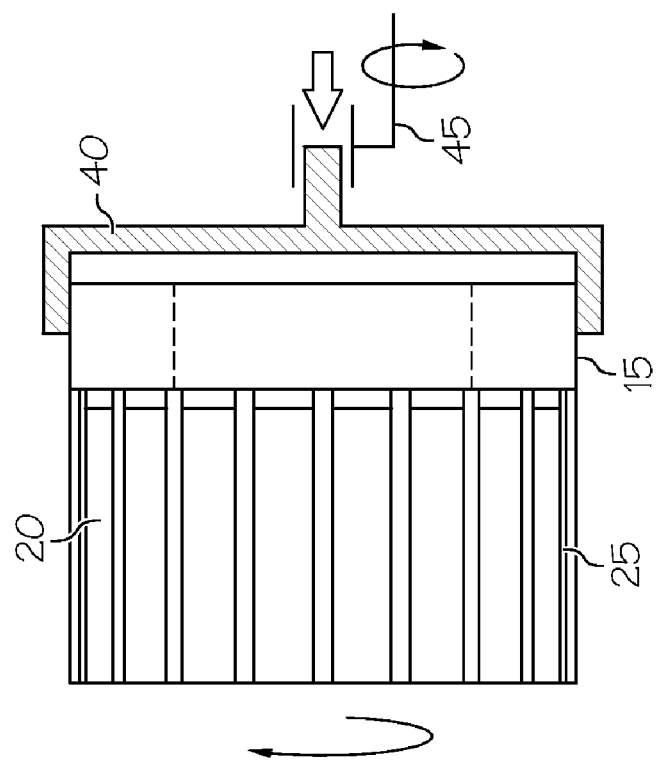
FIGS. 9A-B illustrate how the end ring oscillates against the conductor bars in an orbital circle or ellipse using a mechanical method.
Figure 9A:
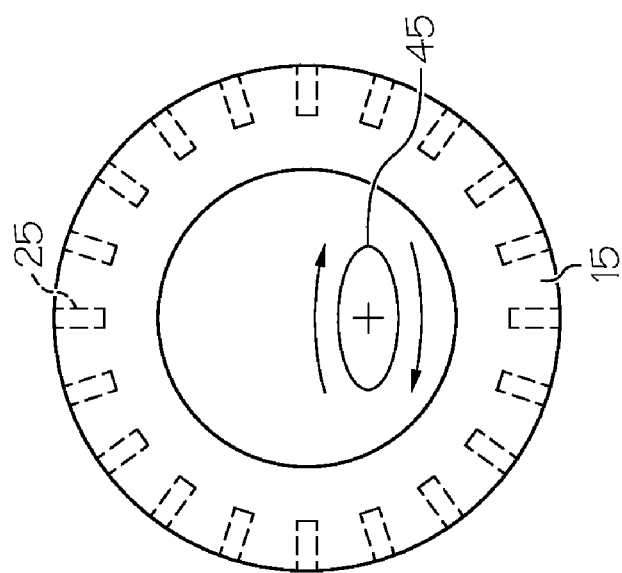

In another embodiment, as illustrated in FIGS. 9A-B, the conductor bars and the end rings oscillate in an orbital circle or elliptical manner using a mechanical method. There is a rotation driver 45 which causes the end ring 15 to rotate in an orbital circle or ellipse, not about its axis.

Figure 10B:
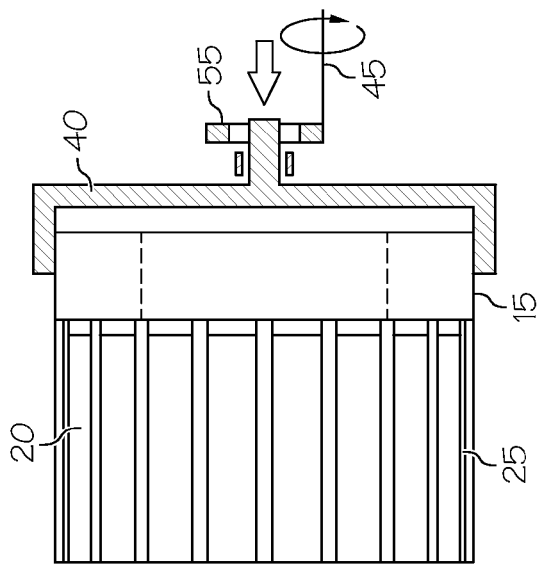
FIGS. 10A-C illustrate how the end ring oscillates against the conductor bars in a square/rectangle using a mechanical method.
Figure 10C:
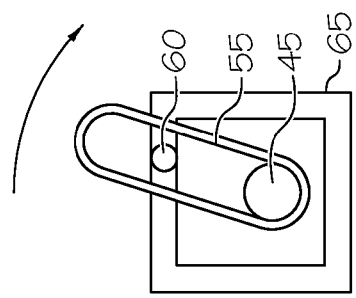
Figure 10A:
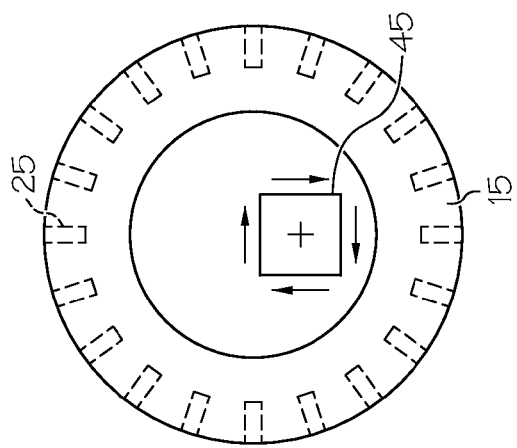

In another embodiment, as illustrated in FIGS. 10A-C, the conductor bars and the end rings oscillate in an square/rectangular (or other shape) manner using a mechanical method. The rotation driver 45 is connected to an axial pin 60 on the end ring fixture 40 by a connecting rod 55. The axial pin 60 rotates in the shape motion guide 65, which can be a square, rectangle, or other shape.

FIGS. 8-10 show the end rings being oscillated and the laminate steel stack and conductor bars being stationary. However, it will be recognized by those of skill in the art that the laminate steel stack and conductor bars could be oscillated and the end rings could be stationary. Alternatively, both the end rings and the laminate steel stack and conductor bars could be oscillated, if desired.

Figure 11B:
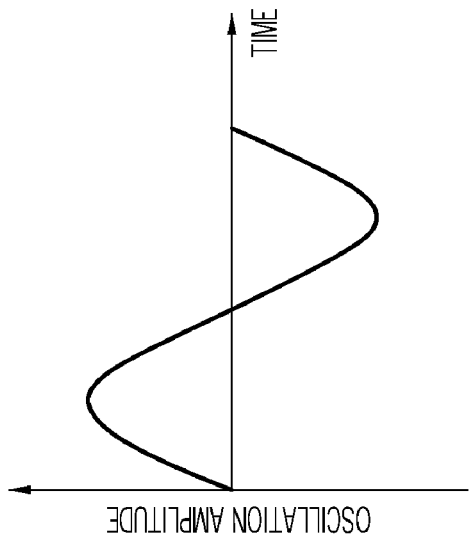
FIGS. 11A-C illustrate how the end ring oscillates against the conductor bars in one direction using an oscillator with a sine wave.
Figure 11C:
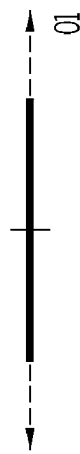
Figure 11A:
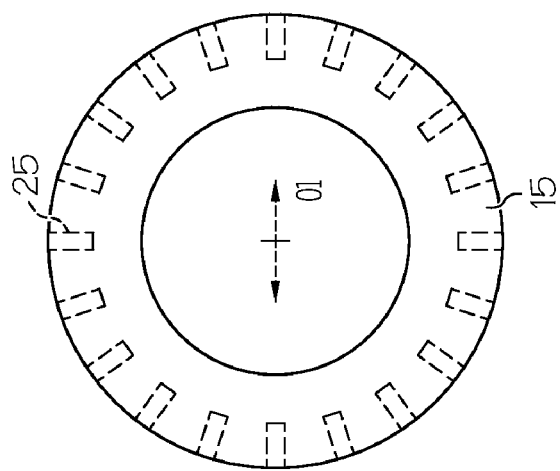

In another embodiment, as illustrated in FIGS. 11A-C, the end ring 15 oscillates against the conductors bars 25 in one direction using an oscillator with a sine wave to produce back and forth motion.

Figure 12B:
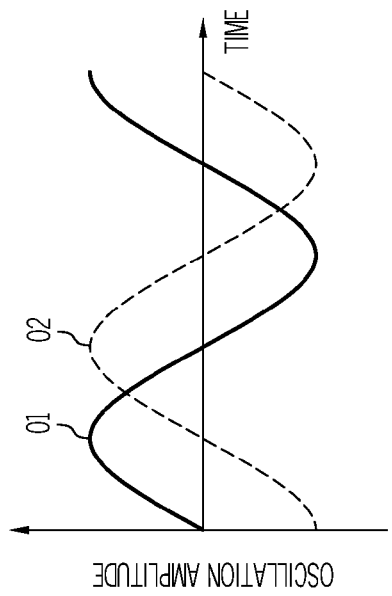
FIGS. 12A-C illustrate how the orbital circular motion oscillation is generated between the end rings and the conductor bars by two oscillators with sine waves.
Figure 12C:
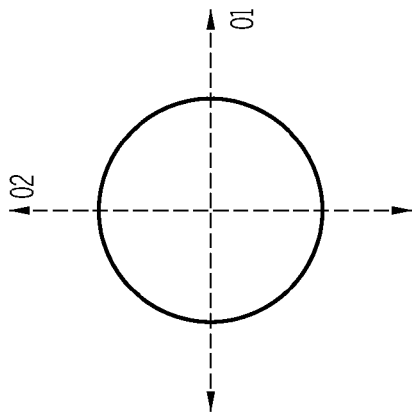
Figure 12A:
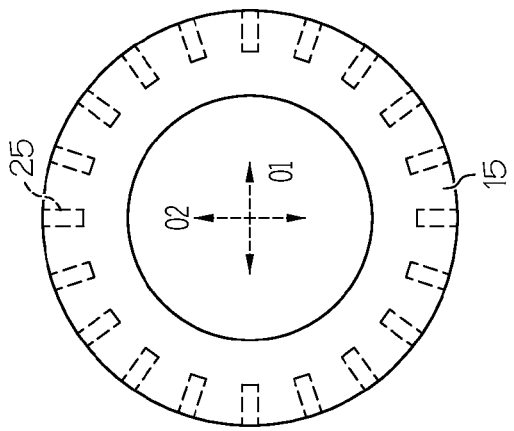

In another embodiment, as illustrated in FIGS. 12A-C, an orbital circular motion oscillation between the end ring 15 and the conductors bars 25 can be obtained by using two oscillators acting in two directions with sine waves having the same oscillation amplitude, but a 90° phase difference.

Figure 13B:
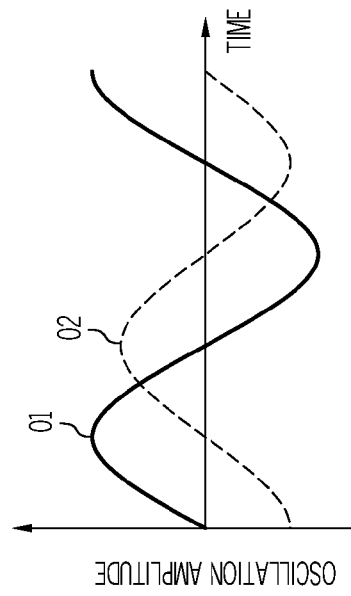
FIGS. 13A-C illustrate how the orbital elliptical motion oscillation is generated between the end rings and the conductor bars by two oscillators with sine waves.
Figure 13C:
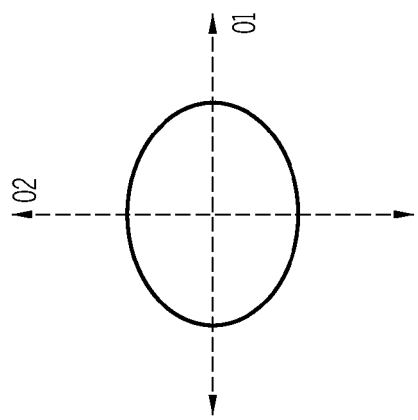
Figure 13A:
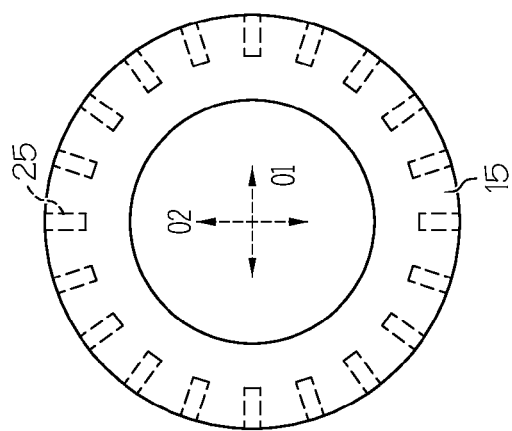

In another embodiment, as illustrated in FIGS. 13A-C, an orbital elliptical motion oscillation between the end ring 15 and the conductors bars 25 can be generated by using two oscillators acting in two directions with sine waves having different oscillation amplitudes and a 90° phase difference.

In another embodiment, as illustrated in FIGS. 14A-C, an orbital rectangular motion oscillation between the end ring 15 and the conductors bars 25 can be obtained by using two oscillators acting in two directions with sawtooth waves having different oscillation amplitude and a 90° phase difference.

Figure 15B:
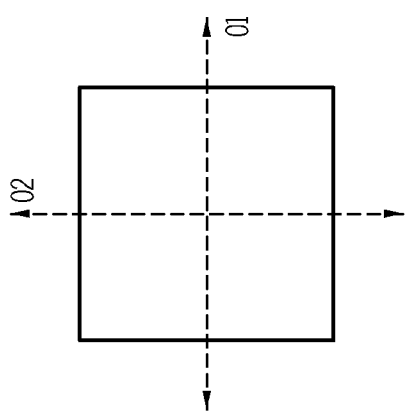
FIGS. 15A-C illustrate how the orbital square motion oscillation is generated between the end rings and the conductor bars by two oscillators with sawtooth waves.
Figure 15C:
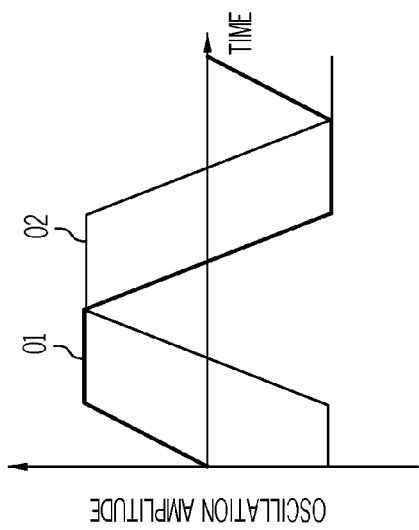
Figure 15A:
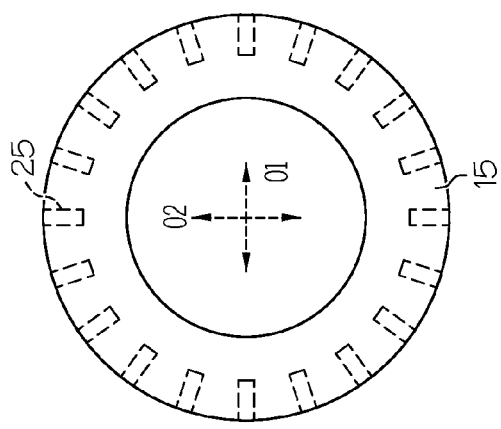

In another embodiment, as illustrated in FIGS. 15A-C, a square motion oscillation between the end ring 15 and the conductors bars 25 can be obtained by using two oscillators acting in two directions with sawtooth waves having the same oscillation amplitude, but a 90° phase difference.

The oscillation friction welding method will provide higher electrical and thermal conductivities, bar strength, and bar and ring interface strength when compared with traditional single-piece aluminum high pressure die cast rotors.

The conductor bars can be skewed, if desired. In some cases, it may be necessary to skew the steel lamination stack before inserting the conductor bars, but this makes bar insertion more difficult.

Using the solid state welding processes described, the plastic deformation is minimal (or non-existent), and there is no displacement of the parts during solid state welding.

By aluminum, we mean aluminum metal, aluminum alloys, aluminum or aluminum alloy composites containing conductive particles, fibers, or tubes (greater than 50% aluminum or aluminum alloy and less than 50% conductive particles, fibers, or tubes), or combinations thereof.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A method of making a rotor comprising;
providing a rotation driver connected to an axial pin on an end ring fixture by a connecting rod;
providing a laminated steel stack having a plurality of longitudinal slots;
placing a plurality of aluminum conductor bars in the longitudinal slots, the conductor bars having first and second ends extending out of the longitudinal slots;
contacting the first and second ends of the conductor bars with a pair of aluminum end rings under pressure; and
oscillating the first and second ends of the conductor bars, the end rings, or both with the rotation driver positioned off of the axis of the center of rotation of the end rings to form an oscillation friction weld.

2. The method of claim 1 wherein oscillation frequency is in a range of about 20 to about 150 Hz.

3. The method of claim 1, wherein and oscillation amplitude is in a range of about 0.05 to about 3 mm.

4. The method of claim 1, wherein the pressure is in a range of about 10 to about 300 MPa.

5. The method of claim 1 wherein the end rings have a yield strength and the conductor bars have a yield strength, and wherein the pressure does not exceed 90% of the yield strength of the lesser of the yield strength of the end rings and the conductor bars.

6. The method of claim 1 wherein an oscillation frequency is in a range of about 20 to about 150 Hz, an oscillation amplitude is in a range of about 0.05 to about 3 mm, and the pressure is in a range of about 10 to about 300 MPa.

7. The method of claim 1 wherein the end rings oscillate and the conductor bars are stationary.

8. The method of claim 1 wherein the end rings are stationary and the conductor bars oscillate.

9. The method of claim 1 wherein an oscillation motion is back and forth, circular, elliptical, rectangular, or square.

10. The method of claim 1 wherein oscillation is produced by a mechanical process.

11. The method of claim 1 wherein a back and forth oscillation is produced using an oscillator with a sine wave function.

12. The method of claim 1 wherein an orbital circular oscillation is produced using two oscillators acting in two directions, each oscillator with a sine wave function, one sine wave function having an oscillation amplitude, the other sine wave function having the same oscillation amplitude and a phase difference of 90°.

13. The method of claim 1 wherein an orbital elliptical oscillation is produced using two oscillators acting in two directions, each oscillator with a sine wave function, one sine wave function having an oscillation amplitude, the other sine wave function having a different oscillation amplitude and a phase difference of 90°.

14. The method of claim 1 wherein an orbital rectangular oscillation is produced using two oscillators acting in two directions, each oscillator with a sawtooth wave function, one sawtooth wave function having an oscillation amplitude, the other sawtooth wave function having a different oscillation amplitude and a phase difference of 90°.

15. The method of claim 14 wherein the laminated steel stack is skewed after the conductor bars are placed in the longitudinal slots.

16. The method of claim 1 wherein an orbital square oscillation is produced using two oscillators acting in two directions, each oscillator with a sawtooth wave function, one sawtooth wave function having an oscillation amplitude, the other sawtooth wave function having the same oscillation amplitude and a phase difference of 90°.

17. The method of claim 1 wherein the conductor bars are skewed to the end rings.

18. The method of claim 1 wherein the end rings or the conductor bars or both are made of wrought aluminum, cast aluminum, or aluminum composites.

19. A rotor comprising:
   a pair of aluminum end rings;
   a cylindric laminate steel stack positioned between the pair of end rings, the laminate steel stack having a plurality of longitudinal slots therein;
   a plurality of aluminum conductor bars positioned in the longitudinal slots of the laminate steel stack, the plurality of conductor bars having first and second ends, the first and second ends being oscillation friction welded to the pair of end rings using the method of claim 1.

20. The rotor of claim 19 wherein the plurality of conductors bars are skewed to the end rings.

* * * * *